United States Patent [19]
Jones

[11] Patent Number: 6,010,176
[45] Date of Patent: Jan. 4, 2000

[54] REVERSIBLE COVER FOR TRUCKS, TRAILERS AND OTHER VEHICLES

[75] Inventor: Samuel H. Jones, Spring, Tex.

[73] Assignee: WorldWide Container Services, Inc., Houston, Tex.

[21] Appl. No.: 08/820,480

[22] Filed: Mar. 18, 1997

[51] Int. Cl.[7] .................................................... B60P 7/04
[52] U.S. Cl. ................ 296/100.16; 135/119; 105/377.02
[58] Field of Search ........................ 296/100.01, 100.15, 296/100.16, 100.17, 100.18, 138, 141, 104; 135/119, 88.09; 52/3, 5; 105/377.02, 377.03

[56] References Cited

U.S. PATENT DOCUMENTS

| 722,873 | 3/1903 | Mutch | 105/377.02 |
|---|---|---|---|
| 1,472,651 | 10/1923 | Holling | 296/138 |
| 1,679,886 | 8/1928 | Wright | 52/3 X |
| 1,858,739 | 5/1932 | Hofrichter | 135/119 X |
| 2,420,706 | 5/1947 | Haven et al. | 135/119 |
| 2,581,985 | 1/1952 | Tuerk | 296/100.16 |
| 3,499,680 | 3/1970 | Stroebel | 296/98 |
| 3,521,927 | 7/1970 | Barry . | |
| 3,614,154 | 10/1971 | Evans . | |
| 4,197,681 | 4/1980 | Holcombe | 135/119 X |
| 4,215,894 | 8/1980 | Sidlinger | 135/88.09 X |
| 4,221,256 | 9/1980 | Karaki | 160/368 R |
| 4,538,385 | 9/1985 | Kandarian | 52/3 |
| 4,968,085 | 11/1990 | Stann . | |
| 5,062,234 | 11/1991 | Green | 135/901 X |
| 5,079,048 | 1/1992 | Anitole | 428/17 |
| 5,238,288 | 8/1993 | Chandler | 135/88.09 X |
| 5,335,960 | 8/1994 | Benignu, Jr. | 296/100.18 |
| 5,445,863 | 8/1995 | Slagle et al. | 428/156 |
| 5,641,192 | 6/1997 | Smith | 296/100.15 X |

FOREIGN PATENT DOCUMENTS

| 0 098 527 | 6/1983 | European Pat. Off. . | |
|---|---|---|---|
| 2517269 | 6/1983 | France | 296/100.16 |
| 271494 | 9/1989 | German Dem. Rep. | 296/100.01 |
| 54613 | 11/1934 | Norway | 135/119 |
| 102617 | 9/1963 | Norway | 135/119 |
| 1384440 | 3/1988 | U.S.S.R. | 296/100.16 |
| 1437779 | 6/1976 | United Kingdom | 52/3 |

*Primary Examiner*—Dennis H. Pedder
*Attorney, Agent, or Firm*—Arnold White & Durkee

[57] ABSTRACT

A reversible soft cover for trucks or other vehicles. The cover contains a central upper portion, and front, rear, and side portions extending from the central portion to completely enclose a bed or cargo area. Each of the front, rear, and side portions may be individually opened, and the rear section may be rolled-up from either inside or outside the vehicle using a lanyard. Flap covers prevent the hemmed side edges of the front, rear, and side portions from exposure, regardless of which surface is exposed, and provide a substantially weatherproof seal between panels.

2 Claims, 6 Drawing Sheets

REVERSIBLE COVER FOR TRUCKS, TRAILERS AND OTHER VEHICLES

BACKGROUND OF THE INVENTION

1. Field of the Invention

The present invention relates to covers for trucks, trailers, and other vehicles, and more particularly to a reversible fabric cover having individually openable sections.

2. Description of the Prior Art

Trucks, trailers, and other vehicles with open cargo areas are often equipped with soft covers which protect the cargo or passengers from the elements and which can be removed in whole or in part to facilitate easy placement or removal of cargo, personnel, or other equipment. Such vehicles typically have a framework with frame members extending above the cargo area for supporting a cover. The framework typically includes lateral ribs or bows, and may also include longitudinal members such as stringers, purlins, or the like. Soft covers are useful in many applications, for instance where it is desired that the cover, or at least sections of the cover, may be easily removed. The term "soft covers" generally includes natural and synthetic textiles, fabrics, sheets, cloths, and like materials, as well as plastic impregnated or laminated materials.

Open bed trucks may at times require the ability to operate without a cover expanding the useable area for greater transportation storage ability. Portions of the cover may be required to be opened for ventilation, while other portions or the entire cover may be required to remain closed to protect the vehicle and the cargo or passengers from the weather.

In general, it is preferred that the exposed pattern, color, or other such surface display of the cover match or coordinate with the vehicle on which it is used; however, it may be useful in certain instances to have the ability to change the surface display of the cover merely by reversing the exposed side. This is the case in military use, for example, where it is particularly important that trucks have covers which match the color or pattern of the vehicle.

Military vehicles carry varying payloads ranging from equipment and personnel to other vehicles. These vehicles are often camouflaged to match the expected terrain in which the vehicles will be deployed. As an example, military vehicles are commonly deployed with the familiar green shaded camouflage pattern intended to generally blend into wooded areas. On the other hand, in the recent excursion of the military to the Persian Gulf during the Desert Storm operation, it was desired that the military vehicles be camouflaged in a sand color to reduce visibility in the desert terrain. In still other instances the vehicles might require white for arctic camouflage, or other patterns or colors to conform to the local environment.

The paint scheme which creates the camouflaged effect on the truck body may be readily changed by repainting. However, the soft covers of the vehicles, which are generally constructed of fabric, are inherently unsuitable for painting because most paints will not bond well to soft fabrics while withstanding exposure to the elements. Additionally, as a cover generally comprises the largest visible portion of a truck, it may be desired to change the appearance of the cover, while leaving the body of the vehicle untouched. As such, multiple soft fabric covers are typically required for a single vehicle in order to match or provide desired camouflage patterns for different deployments.

In the past, soft vehicle covers have not been able to meet the dual demand of reversibility and still be constructed in openable sections. It has been attempted to create such a reversible cover by sewing together two separate fabrics in a back-to-back arrangement. This, however, results in a particularly heavy cover which may sag with standard support structures, and may be difficult to remove or replace. Moreover, because of the rugged treatment that such covers receive, the stitched-together fabrics tend to separate and to be a source of continuous maintenance.

Because it is preferred that individual sections may be opened, it is necessary that the adjacent sections or segments fit together uniformly without breaking the continuity of the overall pattern or color, even when a section is in the open position. Generally, by raising a section the underside is exposed breaking the pattern or color. Additionally, prior covers have utilized a standard hem at the edge of each section, resulting in a partial exposure of the color or pattern on the opposing side.

In general, these covers have been attached using conventional means including strapping the cover to the vehicle body with standard ropes, lanyards, or cords, or in some cases with bungee type cords. These attachments are subject to considerable wear failure, and are not very resilient, especially at low temperatures. In addition, when using rope or cord to attach a vehicle cover it has been expedient to make the connections between the cover and the vehicle by knotting the rope or cord at the ends (and often at intermediate locations). As a result, the only way to remove the cord or rope has been to cut it off.

As a general rule, the ropes or cords have been connected to the cover only at points paralleling the distribution of bows or structural framing members. This has allowed the cover to be pulled taut against each individual bow or structural framing member, but has also allowed the cover to sag in between the adjacent framing members.

The primary source of access to the bed of a truck with a covered cargo area is generally the rear of the vehicle. However, in general the control of such rear access has been from either the inside of the vehicle or from the outside, but not both. Access panels or systems which have allowed the operator to be either inside or outside the vehicle have been cumbersome, and have not been used in a vehicle with a reversible cover.

SUMMARY OF THE INVENTION

The current invention concerns apparatus for covering the bed or cargo area of a truck or other vehicle with a reversible cover that is constructed in openable panels or sections. The panels of the cover may be attached to the vehicle body using resilient rope-like cords, and may be attached to the support structure using snap fittings. Each panel may be individually rolled to an open position allowing access to the vehicle's cargo area. The panels are attached to one another and to the vehicle in such a way as to create a taut, substantially weatherproof cover, while still allowing for easy installation, opening of sections, or reversal of the entire cover. Special weather protection is provided by weather flaps located above the front and rear panels.

When the panels are lowered and attached, a flap cover at alternate panel edges allows the hem of an adjacent panel to be inserted into the flap, and thereby hidden, resulting in a uniform pattern or color from panel-to-panel, as well as substantial weather protection. Another feature of the invention is a rear panel that can be easily rolled up from either inside or outside of the vehicle.

DETAILED DESCRIPTION OF THE INVENTION

Figure 1A:
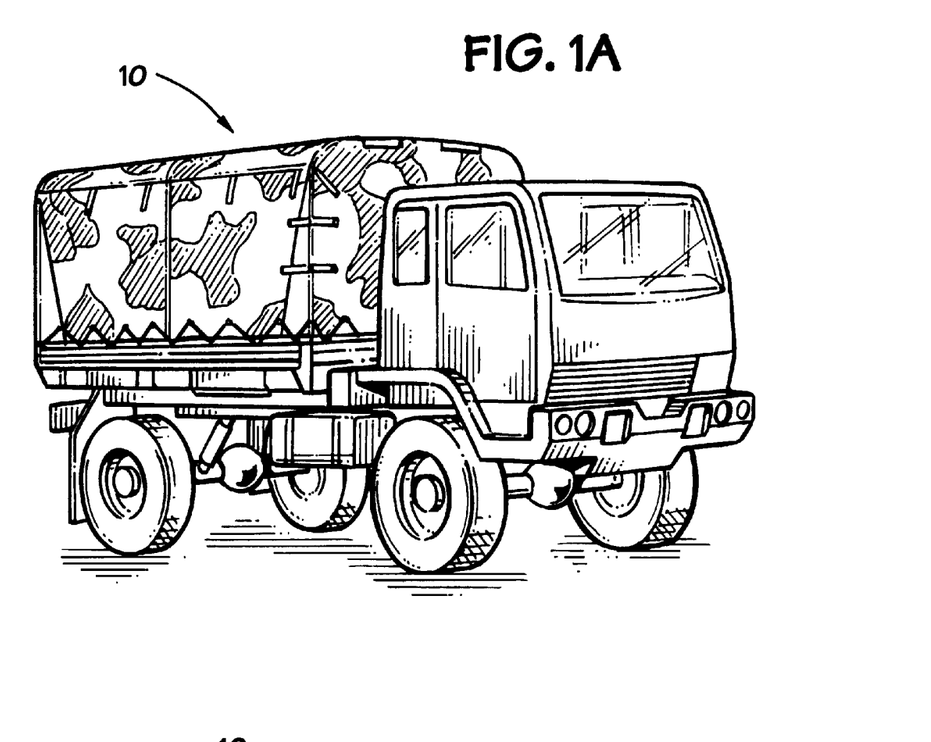
FIG. 1A is a side view of a typical application of a reversible cover of the invention employed on a camouflaged truck.
Figure 1B:
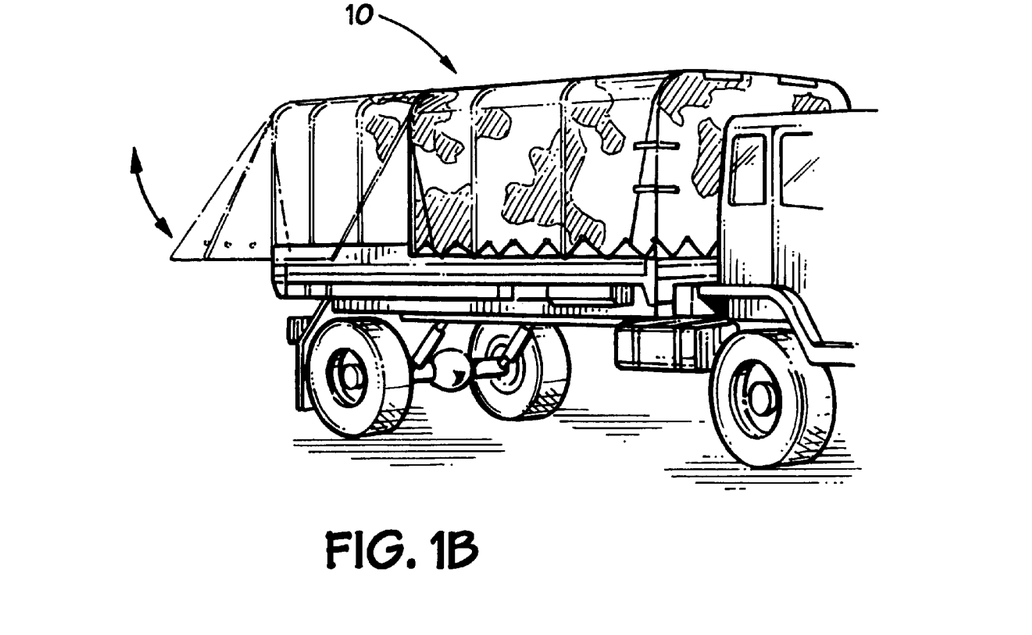
FIG. 1B diagrammatically illustrates how the cover of FIG. 1A is sectional, and how the cover is supported by a framing system.

Similar reference characters are used to indicate similar parts throughout the several views of the drawings. Referring to FIG. 1A of the drawings, one embodiment of the current invention is illustrated. A reversible cover 10 for the cargo area of trucks, trailers, or other vehicles is disclosed. FIG. 1B illustrates that the cover, or sections of the cover, is easily removed and reversed, allowing the appearance of the vehicle to be readily changed without the need for a second cover, or for costly and high maintenance covers constructed with two separate fabrics sewn together back-to-back.

Figure 2:
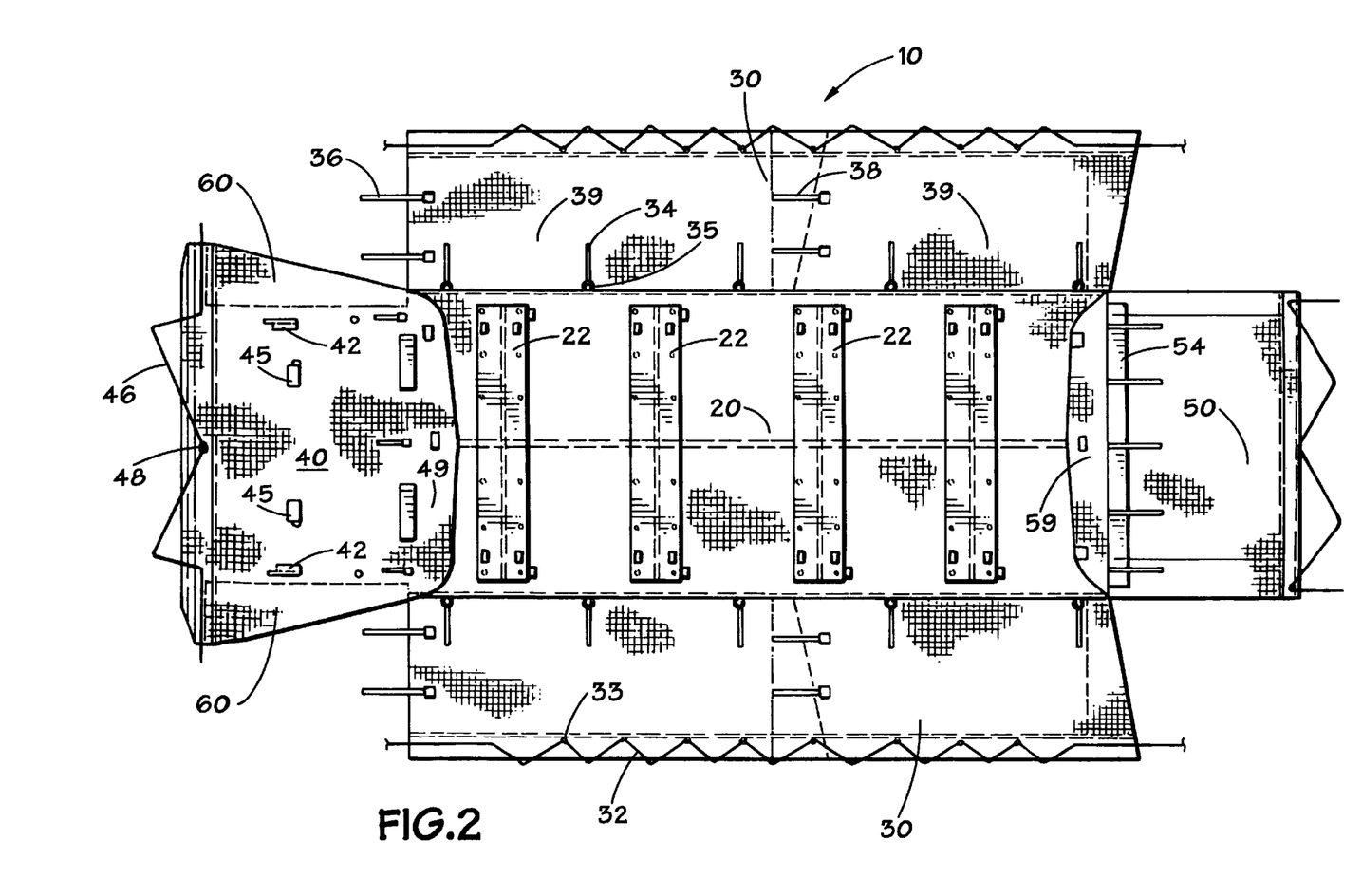
FIG. 2 is a plan view of the reversible cover of FIG. 1 viewed from the top, with multiple side panels per side, a front panel, and a rear panel.

Referring to FIG. 2, the reversible cover 10 is illustrated in a top view showing in one plane all of the panels that form the cover. The cover is comprised of a central panel, the upper panel 20, and additional panels which extend from the upper panel. Although the illustrated embodiment contains six separately openable panels—four side panels 30, a front panel 40, a rear panel 50, and excluding a fixed upper panel 20—numerous other embodiments are possible using greater or fewer panels, as required to suit the configuration requirements of a particular vehicle.

The reversible cover 10 is constructed of a soft material which is substantially weatherproof. Suitable soft materials include natural or synthetic textiles, fabrics, sheets, and the like. As illustrated in FIG. 1B, a support structure is required to provide shape to the cover and allowing material or personnel to be stored below. The cover is suitable for use with ribs, bars, bows, or other elongated frame members, as for example, typical bow and purlin systems. Since the support structure is largely conventional, it is not shown in detail.

Figures 3, 4:
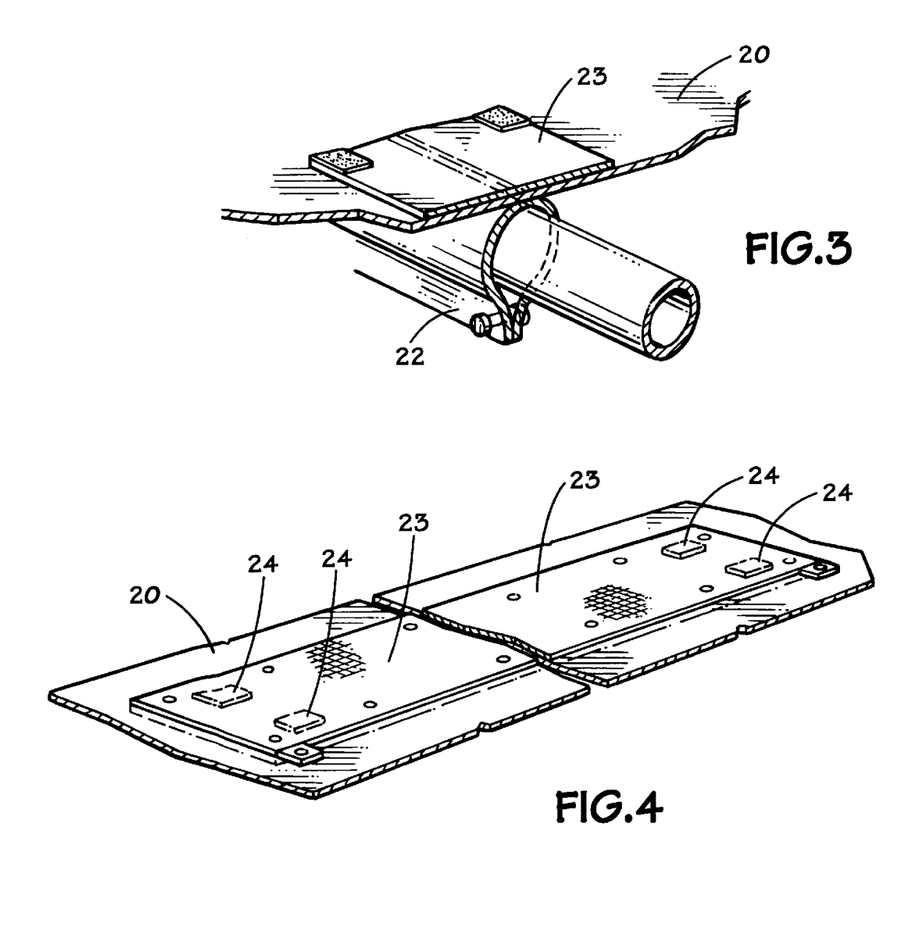
FIG. 3 is a partial section of the reversible cover showing an attachment member of the cover connected to a frame member.
FIG. 4 is a plan view of an unused attachment member of the reversible cover.

Referring again to FIG. 2, the upper panel 20 contains a series of releasable attachment members which are adapted to mount the cover to the support structure. In one embodiment the attachment members comprise snap strips 22 spaced along the long axis of the upper panel 20, transverse to said axis. The snap strips 22 are located to correspond with the bows or other frame members of the cover support structure, and fasten the upper panel securely to resist the loads which can be expected to be imposed by rain and wind loading. FIG. 3 illustrates how the snap strip 22 may be folded around the framing member and closed using male and female type snaps to provide a secure fitfor the cover. Although snap strips have been found to provide quick connection to the support structure, and expeditious removal, other embodiments are envisioned whereby the connection to the support structure is made using straps and rings, hook and loop fasteners, ropes, or other suitable attachment apparatus.

Corresponding snap strips 23 are located back-to-back on the reverse side of the upper panel, in the color or pattern of the reverse side. By arranging the snap strips in this back-to-back fashion, separate apparatus for attaching the upper panel 20 to the support structure is provided independent of which side of the cover is exposed. As a result, when the underside of the cover is connected to the bows or other frame members, the unused snap strips 23 which are exposed on the upper side of the cover's upper panel match the color or pattern of the exposed side. The unused snap strips 23 are provided with fastening means 24 to keep the exposed snap strips (located on the upper-side of the cover) lying flat on the cover's exposed surface, effectively the roof of the cargo area, and prevent the snap strips from being subject to the wind directed across the cover. FIG. 4 illustrates one arrangement wherein the unused snap strips 23 are held flat against the cover 20 by fastening means 24 distributed around the edges of the unused snap strip 23.

In one embodiment, cover 10 is constructed of fabric which displays an integral or permanently applied pattern or solid color on one side, and a different solid color integral or permanently applied to the other side. In this embodiment the fabric used is vinyl coated PVC/nylon MIL-C-20696E, type II, class II, 18 oz, produced by Milliken. All of the panels which together form the cover 10 (upper, side, front, and rear) are constructed of the same material, and are attached in such a way as to maintain continuity in the camouflage pattern. The extending panels, which are coupled to the adjacent upper panel 20, may be attached by sewing, by fabric welding, or by other methods of securely connecting fabric panels. In other embodiments the extending panels may be detachably connected to the upper panel 20 using suitable fasteners.

Like the upper panel 20, the side panels 30 are constructed to fit the length of the cargo area of a given vehicle. Referring again to FIG. 2, the upper edges of side panels 30 are coupled to the upper panel 20. Side panels 30 may be one-piece construction, or, as shown in FIG. 2, may consist of multiple adjoined panels 37 and 39. The number of side panels is not limited and may be any number suitable for the particular vehicle.

Figure 5:
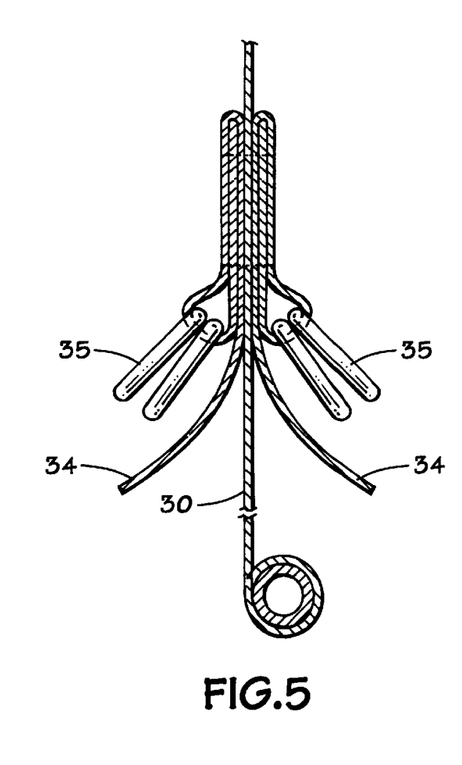
FIG. 5 is a partial detail of the straps and rings used to secure the rear panel in a open position.

Referring to FIGS. 2 and 5, straps 34 and rings 35 are provided on both the interior and the exterior surfaces of the side panels 30. The straps 34 are constructed of soft material such that the pattern or color of a strap matches the pattern or color of the surface of the cover on which the strap resides. When it is desired to open a side panel, shock cords along the bottom edge, used to secure the panels to the vehicle, are detached, and the panel is rolled up inwardly to maintain a consistent display of color or pattern. Straps 34 are used to maintain a panel in the open position by wrapping the straps around the rolled panel and threading the straps through the rings 35 located on the internal side of the panel. When the straps 34 are not in use, i.e., when the panel is in the closed position, the exposed strap on the outer side of the panel may be threaded through the rings 35 located on the same surface, to minimize the effect of wind.

Embodiments are envisioned using hook and loop connectors or other fastening apparatus to help secure the open panel. As all of the extending panels are fixedly connected only to the upper panel 20, it will be recognized that the ability to roll up or open any one panel is not dependent on any other panel being open.

Figure 6:
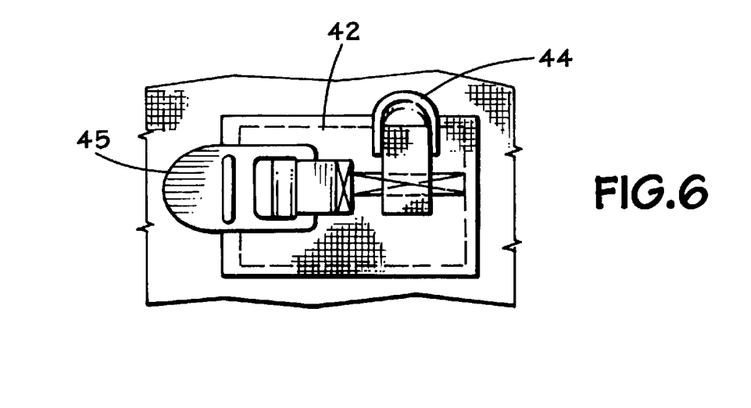
FIG. 6 is a plan view of the fastener used to secure the front panel to a side panel and to a front bow or other support structure.

Additional straps 36 are located at the edges of the side panels 30 to enable the panels to be securely connected to a front panel 40. FIG. 6 details a connector which may be used to secure the front panel 40 to the side panels 30. Front panel 40 has attachment member 42 which contains a pair of rings 44 and a fastening member 45. The pairs of rings 44 is positioned to accept a laterally positioned strap 36 attached to an adjacent side panel 30. When the strap 36 is tightened through the pair of rings 44, the side panel is laterally connected with the front panel forming a tight seal between the panels. It is important that a tight seal is formed between the front and side panels, as the greatest wind load is imposed on the front panel. The straps 36 and pairs of rings 44 are disposed on both the interior and the exterior surfaces of the side and front panels, maintaining the ability to form a tight weather seal without regard to which panel surface is exterior. Moreover, it is an aspect of the invention that at the intersection of the front panel 40 with the side panels 30, a flap 60 is provided which allows the front and side panels to be strapped on both the interior and exterior for greater weather protection in areas subjected to the greatest weather load.

Front panel 40 also contains a front weather flap 49, which provides additional protection against rain or other precipitation entering the portion of the vehicle below the cover 10. When not in use, front weather flap 49 may be held taut to the upper panel 20 using attachment members similar to those used to secure the unused snap strips.

Figure 6A:
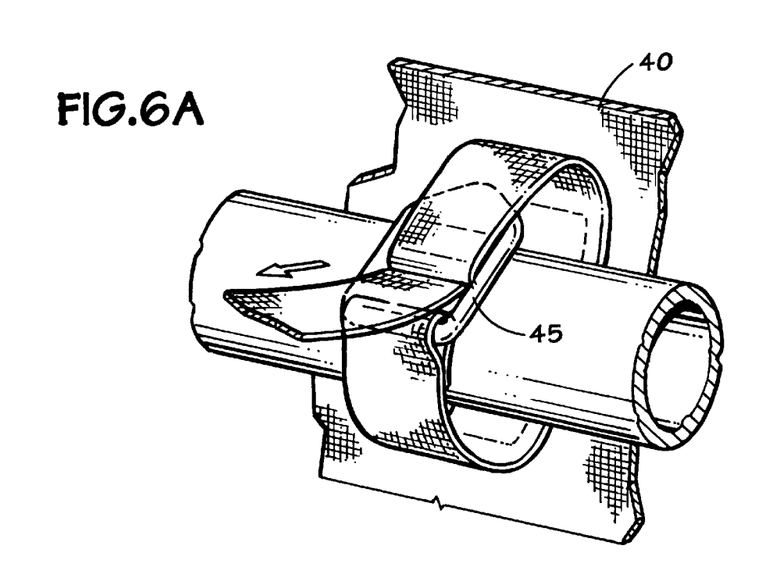
FIG. 6A is a side view of the straps and superlock fasteners used to tighten the front panel to the interior support system.

While straps 36 of attachment member 42 are used to tightly connect the panels, fastening member 45 is used to secure the front panel to the vehicle body. Fastening member 45 contains an integral strap and strap lock. The strap is located based upon the design of the truck such that it may be tightened around a framing member of the vehicle body. Although several types of fasteners may be used for the purpose of fastening the front panel to the front of the vehicle body, for example, rope, cord, hook and loop fasteners, or other suitable attachment apparatus, in one embodiment the fastening member 45 comprises a superlock connector, as shown in FIG. 6A. Such a fastener may be less susceptible to slipping open under the vibration of driving conditions. Identically constructed fastening members are located on the interior and exterior surfaces of the front panel 40, and, while the interior fastening member 45 is attached to the vehicle body, the exterior (unused) fastening member may be threaded through itself to prevent the member from excessive movement due to wind.

The front panel 40 is further attached to the vehicle body using front shock cord 46. Front shock cord 46 may be poly-rope or other suitably resilient rope-like connector as discussed more fully below. The use of shock cords to attach the panels to the vehicle body allows the cover to be easily removed for reversal, or individual sections of the cover to be opened, yet maintains a tight fit between the cover 10 and the truck body.

Front shock cord 46, and side shock cords 32, are resilient rope-like connectors, and may include hooks or other fasteners at opposing ends. The shock cords should retain resiliency through a wide range of temperatures, as may be experienced by the vehicle. In one embodiment, the shock cords are constructed of Proflex 1289, with constant resiliency between 15° F. and 150° F. and a brittle point of –75° F.

Figure 7:
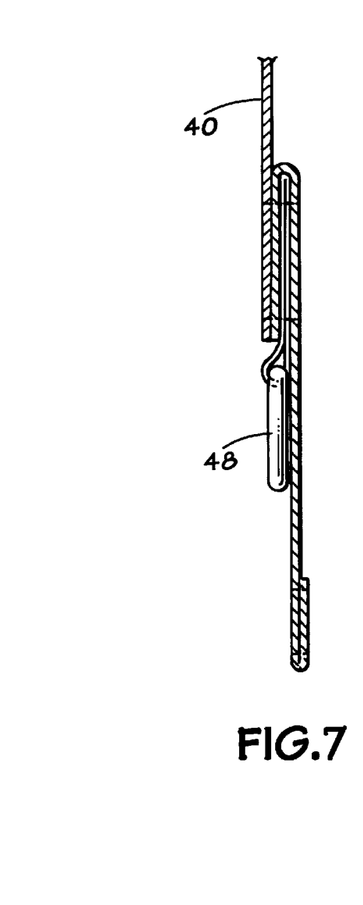
FIG. 7 is a partial detail of a front ring.

The front shock cord 46 is threaded through at least one front ring 48. In other embodiments, front ring 48 may be a webbing loop, a grommet, or other slidable pass through connector. FIG. 7 details one embodiment of the front ring 48. A front ring 48 is located on each of the two sides of the cover, with a strap (and any material used to attach the ring to the cover) corresponding to the color or pattern displayed on the adjacent side.

Figure 8:
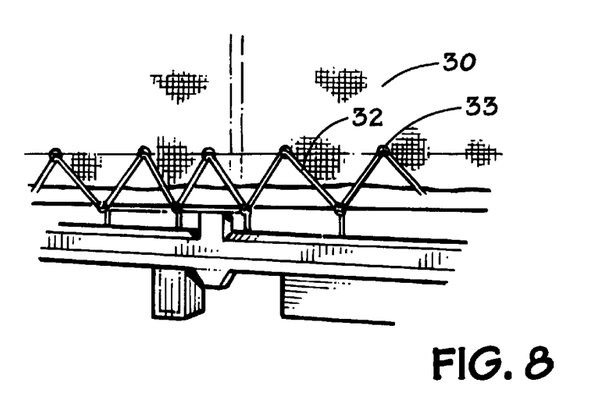
FIG. 8 is a plan view of tensioned resilient rope-like connectors used to secure the lower edge of the panel to the vehicle body.

Referring to FIGS. 2 and 8, side shock cords 32 or other suitable rope-like connectors are threaded through rings, webbing loops, grommets, or other slidable pass-through connectors 33 distributed along the lower edge of the side panels 30, and connected to suitable attachment points on the vehicle body. It is an aspect of the invention that the slidable pass-through connectors 33 are disposed along the lower edge of a panel such that when a rope-like connector 32 is passed through and tightened down to the vehicle body, the tension and stress in the cover is distributed across the cover between two adjacent framing members. Although the rope-like connector 32 may be attached to a panel at a pass-through connector 33 located to correspond with the location of a framing member, under normal conditions the cover would likely sag in the area between panels, possibly requiring the installation of additional fining. By placing the slidable pass-through connectors at locations corresponding to specific points between the framing members, the cover can be pulled taut at and between framing members. The location of these points will vary depending on the framing configuration of a particular vehicle.

Figure 9:
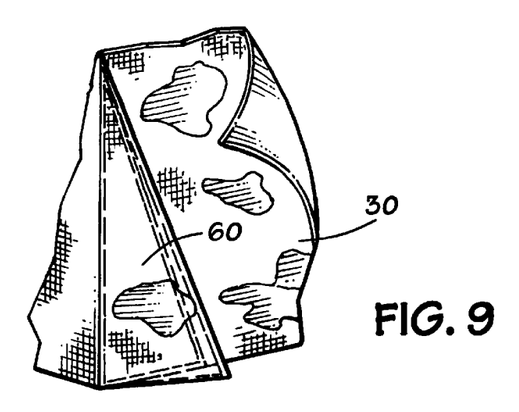
FIG. 9 is a detail of the flap cover which prevents the hem of an underlying panel from being exposed.
Figure 10:
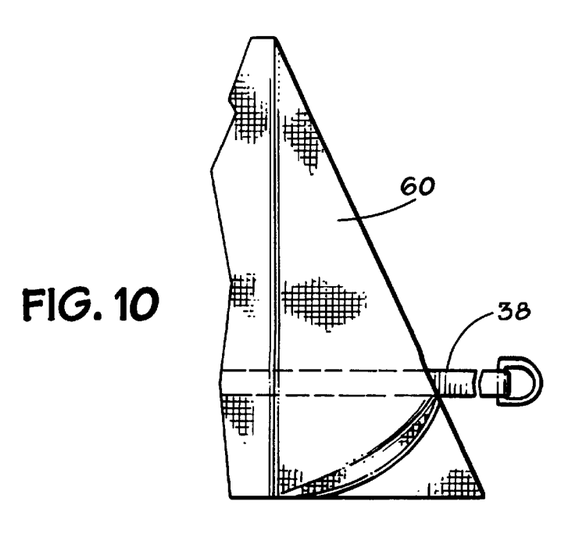
FIG. 10 illustrates how the flap cover may be fastened.

Front panel 40 and each of the side panels 30 include flap covers 60 which allow the hemmed edge of an adjacent panel to be hidden from view. FIGS. 9 and 10 illustrate that flap cover 60 is constructed of two layers of the cover fabric, such that the outer layer always conforms to the exposed color or pattern. The hemmed edge of an adjacent panel can be inserted between the two layers of the flap cover 60. Flap cover 60 may be constructed such that the lower edge is longer than the upper edge, and may be constructed in a triangular configuration. The taper from the narrow top edge has at least two benefits. First, the greater length at the bottom makes the panel more stable, since the majority of the area of the panel is proximate the truck body to which it is secured. The upper edge, which is not directly secured, is tapered so that less area is subjected to wind load. Second, because of the triangular shape, and the direction of wind across the cover when the truck is in motion, rain or other precipitation will drain along the perimeter toward the base of the flap cover. This results in a more weatherproof cover.

Straps or other suitable fasteners are located on both sides of a panel whose side edge is to be inserted into the flap cover 60. Rings or other fastening devices designed to mate with the above strap are located so as to form a matched pair with the straps. After a side edge of a panel is inserted between the layers of a flap cover 60, the straps and rings are fastened, holding the flap cover 60 taut at both the interior and exterior surface of the cover 10. It has been found that this inner and outer fastening in conjunction with the shape of the flap cover 60 results in a substantially weatherproof seal.

Where multiple side panels are employed, as illustrated in FIG. 2, each side panel contains a flap cover 60 which allows the hemming of an adjacent side panel to be hidden from view. In addition, to provide a substantially weather-tight seal between the panels, straps 38 are provided which may be lashed to rings or other suitable connectors on the adjacent panels. Where only a single side panel is utilized on each side, the flap cover 60 for each side panel is designed to fasten to the rear panel 50.

Figure 11:
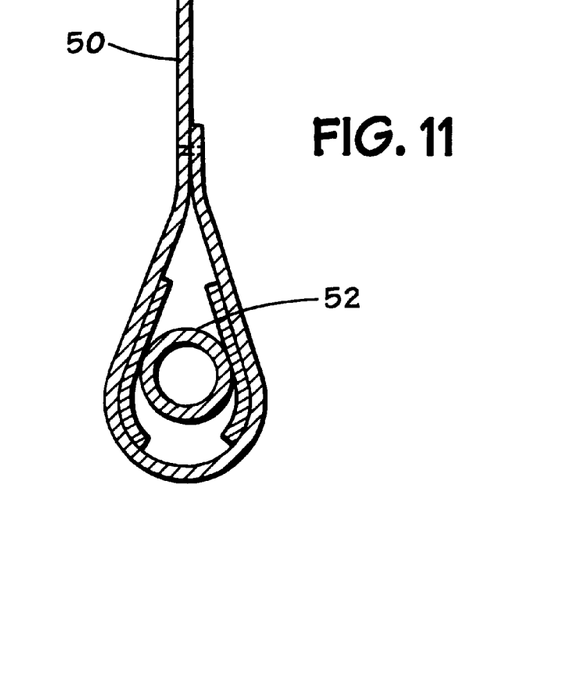
FIG. 11 is a partial side view of a rear panel.

A rear panel 50 contains a roll-up door with a lanyard and may be rolled up from either side (the inside or the outside of the truck). Referring to FIG. 11, a pipe 52 is preferably contained in the bottom of the panel by folding and securing the exposed side of the rear panel 50 around the pipe 52. Pipe 52 maintains the shape of the panel during roll-up and provides a profile that can be more easily secured when the panel is in the rolled-up position. In general, the rear panel 50 is the panel through which the majority of cargo or personnel will be loaded and unloaded, therefore it is important that the panel be easily opened from either inside or outside of the vehicle. Pipe 52 adds both weight and stability to the bottom of rear panel 50, allowing the rear panel to be easily opened by means of a lanyard, from either inside or outside of the vehicle.

Figure 12:
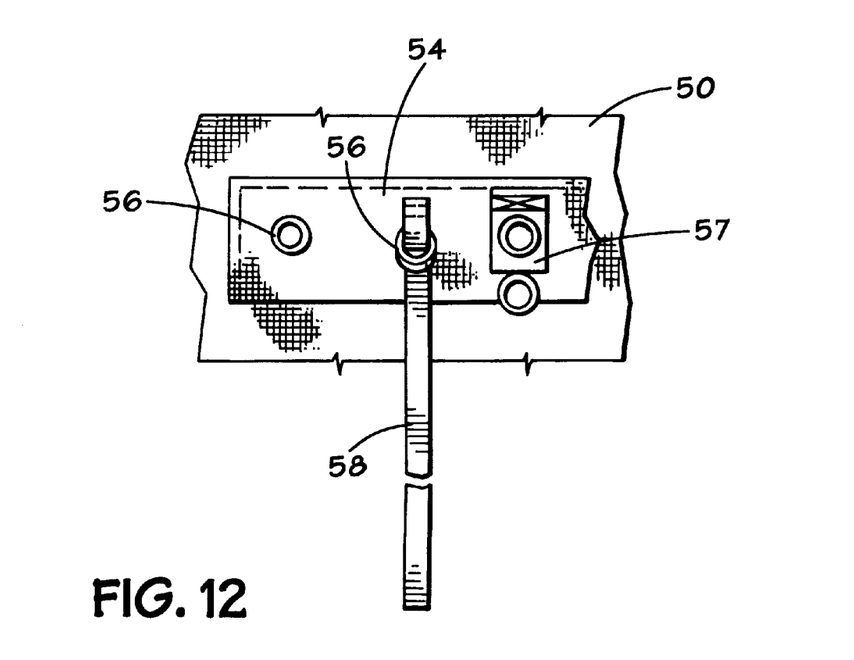
FIG. 12 is a partial detail of a rear panel closing strip.

Referring to FIG. 12, a detail of a closing strip 54 used to maintain a rear panel in the open position is shown. As may be seen in FIG. 2, the closing strip 54 extends across the upper portion of the rear panel, and may be sewn or welded to the rear panel. Closing strip 54 is constructed to match the underlying pattern or color. An identical closing strip is attached at the opposite side of the panel, in the color pattern matching the opposite side. Closing strip 54 contains a series of straps 58 and a series of rings 56. In a rolled-up position, the rear panel 50 is secured by fabric straps 58 which are threaded through the rings 56 on the opposing side of the panel. Although in the present embodiment rings and straps are employed, other fastening methods may be used.

Closing strip 54 also contains grommets or other slidable members 55, which allow the lanyard to be threaded through, and provide tie-off points 57 for the lanyard when the rear panel 50 is in the open position. The lanyard operates similar to a venetian blind cord, in that distinct ends of the lanyard are connected at a minimum of two points to the weighted rear panel 50. The lanyard slides through slidable members 55, and can be tied off to allow the rear panel to maintained fully-open, fully-closed, or at any point in between.

Rear panel 50 also contains a rear weather flap 59, which provides additional protection against rain or other precipitation entering the vehicle. When not in use, rear weather flap 59 may be held taut to the upper panel 20 using attachment members.

The above description and several embodiments of the present invention are made by way of example and not for purposes of limitation. Many variations may be made to the embodiments disclosed herein without departing from the scope and spirit of the present invention. For example, while the above description is directed to a cover for trucks and trailers having top, side, front, and rear panels, the present invention is applicable to non-standard vehicles having any number of sides. In addition, the cover could be a tarpaulin having similar connections and reversibility. The present invention is intended to be limited only by the scope and spirit of the following claims.

What is claimed is:

1. A cover for a vehicle having an open cargo area, frame members extending above the cargo area from the perimeter of the cargo area to support a cover, and connectors distributed along the perimeter of the cargo area for securing ropes or the like, wherein said cover comprises:

an upper panel, a front panel, a rear panel, and opposing side panels, at least some of said panels being rollable, and all of said panels being reversible and comprising a soft, weather-resistant material having different coloration on their opposite surfaces, said front, rear, and side panels further including slidable pass-through connectors proximate their bottom edges for receiving rope-like connectors;

said upper panel detachably connected to the top of the frame members and including integral elongated snap strips positioned on each surface of the top panel to embrace the top frame members, said snap strips having a coloration corresponding to the coloration of the panel surface to which they are attached;

fastening members distributed along each said snap strip, said fastening members detachably connecting each said snap strip which is not engaged with said top frame members to said upper panel;

said front panel coupled along its top edge to the upper panel and detachably secured along its bottom edge to the perimeter of the cargo area, said front panel including laterally opposite two-layered flap covers selectively able to wrap around the front portions of the adjacent side panels and to be detachably secured to the side panels to form a seal with each adjacent side panel;

each side panel coupled along its top edge to the top panel and detachably secured along its bottom edge to said perimeter of the cargo area, the rear edge of each side panel including a two-layered flap cover selectively able to wrap over and under and detachably couple to an adjacent rearward panel to form a substantially weatherproof seal with the adjacent rearward panel;

and said rear panel coupled along its top edge to the top panel.

2. A reversible cover for an open cargo area of a vehicle having a support structure over the cargo area to support the cover, the cover comprising:

a plurality of reversible soft material panels including a top panel and a plurality of side panels, each said panel having a first side and a second side, each of said side panels having a pattern on said first side and a solid color on said second side, and each of said side panels being separately openable;

at least one snap strip adapted to mount said plurality of reversible soft material panels to said support structure wherein said snap strip may be alternately fastened to the reversible cover if a side of the reversible cover to which the snap strip is attached is exposed, or mounted to the support structure if said side of the reversible cover to which it is attached is in contact with the support structure;

a plurality of slidable pass-through connectors disposed proximate an edge of each of said side panels, and adapted to receive a rope-like connector detachably securing said side panels to said truck;

a plurality of straps and fasteners coupled to an upper portion of said side panels, being adapted to secure each of said side panels in an open position;

a flap cover adjoined to a side edge of each of said side panels, having an inner portion and an outer portion adapted to enfold and couple to a side edge of an adjacent panel when engaged.

* * * * *